United States Patent [19]
Fuhr et al.

[11] Patent Number: 5,658,974
[45] Date of Patent: Aug. 19, 1997

[54] FLAMEPROOFED, THERMOPLASTIC POLYCARBONATE MOULDING COMPOUNDS

[75] Inventors: Karl Fuhr, Krefeld; Thomas Eckel, Dormagen; Dieter Wittmann, Leverkusen; Heinrich Alberts, Odenthal, all of Germany

[73] Assignee: Bayer AG, Leverkusen, Germany

[21] Appl. No.: 539,232

[22] Filed: Oct. 4, 1995

[30] Foreign Application Priority Data

Oct. 14, 1994 [DE] Germany ............... 44 36 776.7

[51] Int. Cl.$^6$ .................................. C08K 5/523
[52] U.S. Cl. ................ 524/127; 524/141; 524/265
[58] Field of Search .................... 524/127, 141, 524/265, 266; 525/72, 67

[56] References Cited

U.S. PATENT DOCUMENTS

| | | | |
|---|---|---|---|
| 4,273,691 | 6/1981 | MacLaury et al. | 260/23 S |
| 4,387,176 | 6/1983 | Frye | 524/268 |
| 4,536,529 | 8/1985 | Frye et al. | 524/284 |
| 4,871,795 | 10/1989 | Pawar | 524/267 |
| 5,030,675 | 7/1991 | Wittmann et al. | 524/130 |
| 5,061,745 | 10/1991 | Wittmann et al. | 524/139 |
| 5,100,958 | 3/1992 | Fuhr et al. | 525/66 |
| 5,204,394 | 4/1993 | Gosens et al. | 524/125 |
| 5,242,744 | 9/1993 | Schryer | 428/224 |

FOREIGN PATENT DOCUMENTS

| | | |
|---|---|---|
| 0 272 441 | 6/1988 | European Pat. Off. . |
| 0 363 608 | 4/1990 | European Pat. Off. . |
| 0 520 186 | 12/1992 | European Pat. Off. . |
| 521628 | 1/1993 | European Pat. Off. . |
| 0 594 021 | 4/1994 | European Pat. Off. . |
| 0 645 422 | 3/1995 | European Pat. Off. . |
| 40 40 243 | 9/1991 | Germany . |
| 43 01 730 | 7/1993 | Germany . |

OTHER PUBLICATIONS

Orbit Abstract of EP 0 272 441 (Jun. 29, 1988).
Orbit Abstract of DE 40 40 243 (Sep. 12, 1991).
Orbit Abstract of EP 0 594 021 (Apr. 27, 1994).
Patent Abstracts of Japan, vol. 95, No. 4, May 31, 1995, abstract of JP-A-07 026129 (Nippon Steel Chem. Co. Ltd.) Jan. 27, 1995.
Chemical Abstracts, vol. 119, No. 8, Aug. 23, 1993, abstract of JP-A-04 298554 (Nihon GE Plastics, Ltd.) Oct. 22, 1992.
Patent Abstracts of Japan, vol. 18, No. 528 (C-1258), Oct. 6, 1994, abstract of JP-A-06 184357 (Asahi Chem. Ind. Co. Ltd.) Jul. 5, 1994.

*Primary Examiner*—Veronica P. Hoke
*Attorney, Agent, or Firm*—Connolly & Hutz

[57] ABSTRACT

The invention relates to halogen-free, flameproofed, thermoplastic moulding compounds made from polycarbonate and graft polymers which may optionally contain a copolymer and/or polyalkylene terephthalate, wherein a silicon resin in combination with a blend of monophosphate and oligomeric polyphosphates is used as a flameproofing agent.

10 Claims, No Drawings

FLAMEPROOFED, THERMOPLASTIC POLYCARBONATE MOULDING COMPOUNDS

The invention relates to halogen-free, flameproofed, thermoplastic moulding compounds of polycarbonate and graft polymers which may optionally contain thermoplastic copolymers and/or polyalkylene terephthalate, wherein silicone resin in combination with special phosphorus compounds is used as a flame proofing agent.

U.S. Pat. No. 5,061,745 and U.S. Pat. No. 5,030,675 describe flame resistant, thermoplastic moulding compounds made from polycarbonate, ABS polymer, a copolymer or polyalkylene terephthalate as well as monophosphates and fluorinated polyolefins as a flameproofing agent and anti-drip agent. A disadvantage of fluorinated polyolefins which may be mentioned is their halogen content and the hydrogen fluoride which is formed therefrom in the event of a fire. The incorporation of special polytetrafluoroethylene on its own, however, has hitherto made possible the production of self-extinguishing moulding compounds made from aromatic polycarbonates, optionally thermoplastic copolymers and thermoplastic polyalkylene terephthalates as well as graft polymers with the assessment V-O using 1.6 mm thick test specimens in accordance with UL-94.

EP-A 0 363 608 describes polymer mixtures of aromatic polycarbonate, copolymers and graft polymers and oligomeric phosphates based on e.g. hydroquinone and resorcinol as flameproofing additives. Effective flameproofing of V-O/1.6 mm in accordance with UL-94 is only achieved in the presence of polytetrafluoroethylene.

U.S. Pat. Nos. specifications 4,273,691, 4,387,176, 4,536,529, 4,871,795 and 5,242,744 claim thermoplastic materials with a flameproofing system of silicone oils or a mixture of a silicone oil and a silicone resin as well as a metal soap (Mg stearate) and optionally magnesium hydroxide. Further additional flameproofing additives cited are halogen-containing flameproofing agents (decabromodiphenyl ether), also with antimony trioxide, and ammonium polyphosphate with polyhydric alcohols. The main thermoplastic materials involved are polypropylene and other polymers, with polycarbonate and e.g. polyesters being mentioned in general from time to time. It has to be pointed out here that polycarbonate suffers a clear deterioration in its good mechanical properties as a result of the incorporation of magnesium compounds, V-O/3.2 mm being achievable only by incorporating halogen (see U.S. Pat. No. 4,387,176, column 2, lines 12 to 20) and phosphates are not incorporated.

EP-A 0 520 186 claims flameproofed moulding compounds of polycarbonate, also mixed with ABS components, which contain a phosphorus compound, a boron compound, a polyorganosiloxane and/or a fluorine-containing resin as the flameproofing agent. It can be seen from the examples and comparison examples that the striven for flameproofing of V-O/1.6 mm can only be achieved by incorporating triphenyl phosphate, zinc borate and polydimethylsiloxane and/or polytetrafluoroethylene, without zinc borate and with polydimethylsiloxane, V-O/1.6 mm is not achieved (comparison example 4), with polytetrafluoroethylene instead of polyorganosiloxane, V-1/1.6 mm is produced (see comparison example 5).

DE-OS 4 301 730 describes, in an approximately analogous manner to EP-A 520 186, the effective flameproofing of polycarbonate moulding compounds, zinc salts of carboxylic acids (e.g. zinc acetate) being incorporated instead of a boron compound (zinc borate). If this component is omitted, V-O/1.6 mm is also not achieved by using triphenylphosphate and dimethylsiloxane (e.g. comparison examples 6–8).

U.S. Pat. No. 5,100,958 claims the production of coprecipitates of silicone resins and graft polymers of the ABS type and the mixture of this coprecipitate with polycarbonate and styrene/acrylonitrile copolymers. For effective flameproofing of V-O/1.6 mm, triphenyl phosphate is incorporated as an additional flameproofing agent, in addition the polycarbonate has to contain 10 wt. % of tetrabromobisphenol-A (see Table 1, column 7, line 23). Halogen-free flameproofing cannot be achieved with moulding compounds according to U.S. Pat. No. 5,100,958.

It was found that when using of 0.5 to 5 wt. % of silicone resin in combination with 3 to 18 wt. % of a phosphorus compound in accordance with component E) described below, self-extinction without the production of burning droplets according to UL-94 with the assessment V-O to V-1 for 1.6 mm thick test specimens is produced for moulding compounds made from thermoplastic aromatic polycarbonates, optionally thermoplastic copolymers and thermoplastic polyalkylene terephthalates as well as graft polymers. Polytetrafluoroethylene, hitherto used as an anti-drip agent, is not required. Moulding compounds according to the invention thus enable the provision, in the event of a fire, of completely halogen-free, highly effective, self-extinguishing moulding compounds. Use of component E.2) described below, enables improved stress cracking resistance, which is particularly important for the production of thin-walled housing sections. The moulding compounds exhibit a good set of properties with regard to impact and notched impact resistance, heat resistance, surface finish and migration during storage.

The present invention provides halogen-free, flameproofed thermoplastic polycarbonate moulding compounds which do not produce burning droplets in the event of a fire, consisting of A) 50 to 95 wt. %, preferably 60 to 90 wt. %, of thermoplastic aromatic polycarbonate, B) 0 to 20 wt. %, preferably 1 to 15 wt. %, of a copolymer or polycondensate consisting of
  B.1) a thermoplastic copolymer of
    B.1.1) 50 to 95 wt. % of styrene, α-methylstyrene, ring-alkylated styrene, $C_1$–$C_8$-alkyl acrylate, $C_1$–$C_8$-alkyl methacrylate or mixtures thereof and
    B.1.2) 5 to 50 wt. % of acrylonitrile, methacrylonitrile, $C_1$–$C_8$-alkyl acrylate, $C_1$–$C_8$-alkyl methacrylate, maleic anhydride, N-substituted maleic imide, vinyl acetate or mixtures thereof and/or
  B.2) a thermoplastic polyalkylene terephthalate, C) 3 to 18 wt. %, preferably 5 to 15 wt. %, of a graft polymer prepared from
  C.1) 5 to 90 wt. %, preferably 30 to 80 wt. %, of a mixture of
    C.1.1) 50 to 95 wt. %, of styrene, α-methylstyrene, ring-alkylated styrene, $C_1$–$C_8$-alkyl acrylate, $C_1$–$C_8$-alkyl methacrylate or mixtures thereof and
    C.1.2) 5 to 50 wt. % of acrylonitrile, methacrylonitrile, $C_1$–$C_8$-alkyl acrylate, $C_1$–$C_8$-alkyl methacrylate, maleic anhydride, N-substituted maleic imide or mixtures thereof, on
  C.2) 10 to 95 wt. %, preferably 20 to 70 wt. %, of rubber with a glass transition temperature TG $\leq 10°$ C., D) 0.5 to 5 wt. %, preferably 1 to 3 wt. %, of silicone resin, E) 3 to 18 wt. %, preferably 5 to 15 wt. %, of phosphates consisting of E.1) phosphorus compounds of the formula (I),

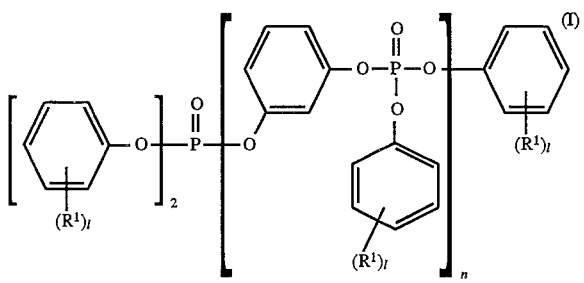

in which
n represents the numbers 1 to 5,
$R^1$ represents methyl and
l represents the ambers 0 to 5, preferably 0 and 1 to 3, or E.2) a mixture of phosphorus compounds of the formula (I) and phosphorus compounds of the formula (II),

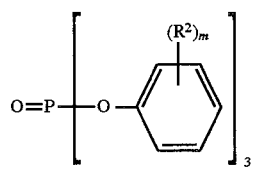

in which $R^2$ represents methyl and
m represents the numbers 0 or 1 to 5, preferably 0 and 1 to 3, wherein the amount of phosphorus compound of the formula (II) in the phosphate mixture of E.1) and E.2) is a maximum of 35 wt. %, preferably a maximum of 30 wt. %.

Component A)

Suitable thermoplastic polycarbonates according to the invention in accordance with component A) may be either homopolycarbonates or copolycarbonates of diphenols of the formula (III),

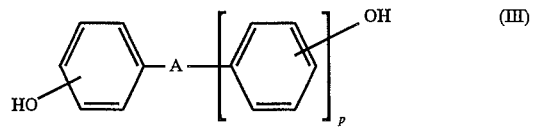

in which
p is 1 or zero and
A may be a single bond, a $C_1$–$C_5$-alkylene or a $C_2$–$C_5$-alkylidene group, a $C_5$–$C_6$ cycloalkylidene group optionally substituted by methyl-groups, —O—, —S— and —SO$_2$—.

Polycarbonates in accordance with component A) may be either linear or branched, they may contain aromatically bonded methyl groups and are halogen-free. The polycarbonates in component A) may be used either individually or as a mixture.

Diphenols of the formula (III) are either known from the literature or can be prepared by processes known from the literature. Preparation of suitable polycarbonates according to the invention in accordance with component A) is also known from the literature and may take place, for instance, using phosgene, by the phase boundary process or, using phosgene, by a process in a homogeneous phase (the so-called pyridine process), wherein the molecular weight being set each time is produced in a known way by means of appropriate amounts of known chain stoppers.

Suitable diphenols of the formula (III) are, e.g. hydroquinone, resorcinol, 4,4'-di-hydroxydiphenyl, 2,2-bis-(4-hydroxyphenyl)-propane (bisphenol-A), 2,4-bis-(4-hydroxyphenyl)-2-methylbutane, 2,2-bis-(4-hydroxy-3,5-dimethylphenyl)-propane, 1,1 -bis-(4-hydroxyphenyl)-cyclohexane or 1,1 -bis-(4-hydroxyphenyl)-3,3,5-trimethylcyclohexane. Preferred diphenols of the formula (III) are 2,2-bis-(4-hydroxyphenyl)-propane and 1,1 -bis-(4-hydroxyphenyl)-cyclohexane. Mixtures of diphenols may also be used, e.g. of bisphenol-A and up to 60 mol- % of 1,1-bis-(4-hydroxyphenyl)-3,3,5-trimethylcyclohexane.

Both homopolycarbonates and copolycarbonates are suitable. For the preparation of copolycarbonates A) according to the invention it is also possible to use 1 to 25% by weight, preferably 2.5 to 25% by weight (based on the total quantity of diphenols to be used), of diphenols of the formula (IIIa)

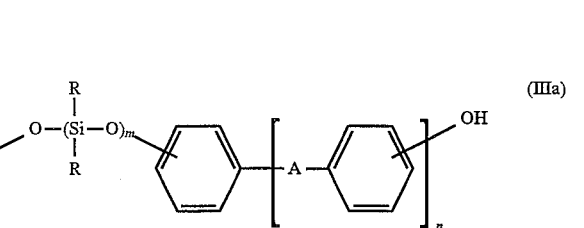

in which
-A- has the meaning mentioned for formula (III),
n is 1 or zero,
the R's are identical o,r different and are linear $C_1$–$C_{20}$-alkyl, branched $C_3$–$C_{20}$-alkyl or $C_6$–$C_{20}$-aryl, preferably $CH_3$, and
m is an integer between 5 and 100, preferably between 20 and 80.

Polydiorganosiloxanes containing hydroxy-aryloxy end groups according to formula (IIIa) are known (see for example U.S. Pat. No. 3,419,634) or can be prepared by processes known from the literature. The preparation of polydiorganosiloxane-containing copolycarbonates is described for example in DE-OS 3 334 782. Polycarbonates A) may be replaced completely or partially by aromatic polyestercarbonates.

Suitable chain stoppers are, for instance, phenol or p-tert.-butylphenol, but also long-chain alkylphenols such as 4-(1, 3-tetramethyl-butyl)-phenol in accordance with DE-OS 2 842 005 or monoalkylphenols or dialkylphenols with a total of 8 to 20 carbon atoms in the alkyl substituents in accordance with German patent application 3 506 472, such as, for instance, p-nonylphenol, 2,6-di-tert.-butylphenol, p-tert.-octylphenol, p-dodecylphenol, 2-(3,5-dimethylheptyl)-phenol and 4-(3,5-dimethylheptyl)-phenol. The amount of chain stoppers to be used is in general between 0.5 and 10 mol- %, with reference to the sum of each of the diphenols (III) used.

Suitable polycarbonates according to the invention in accordance with component A) may be branched in a known manner, in fact preferably by the incorporation of 0.05 to 2 mol- %, with respect to the sum of the diphenols used, of trifunctional or more than trifunctional compounds, e.g. those with three or more than three phenolic OH groups.

Suitable polycarbonates according to the invention have mean weight-average molecular weights ($M_w$, measured e.g. by ultracentrifuging or by light-scattering measurements) of 10,000 to 200,000, preferably 20,000 to 80,000.

Component B.1)

Vinyl (co)polymers which can be used according to the invention in accordance with component B.1) are resin-like, thermoplastic and rubber-free. They are those consisting of at least one monomer from the set comprising styrene, α-methyl styrene, ring-alkylated styrene, $C_1$–$C_8$-alkyl acrylate, $C_1$–$C_8$-alkyl methacrylate (component B.1.1) with at least one monomer from the set comprising acrylonitrile, methacrylonitrile, $C_1$–$C_8$-alkyl methacrylate, $C_1$–$C_8$-alkyl acrylate, maleic anhydride, N-substituted maleic imide and/or vinyl acetate (component B.1.2).

$C_1$–$C_8$-alkyl acrylates and $C_1$–$C_8$-alkyl methacrylates are esters of acrylic acid and methacrylic acid respectively and monohydric alcohols with 1 to 8 carbon atoms. Methyl, ethyl and propyl methacrylate are particularly preferred. Methyl methacrylate may be mentioned as a particularly preferred methacrylate.

Thermoplastic copolymers with a composition in accordance with component B.1) can be produced as secondary products during graft polymerisation to produce component C), especially when large amounts of monomers are grafted onto small amounts of rubber. The amounts of copolymer B.1) to be used according to the invention do not include these secondary products from graft polymerisation.

Thermoplastic copolymers B.1) contain 50 to 95 wt. %, preferably 60 to 90 wt. %, of component B.1.1) and 5 to 50 wt. %, preferably 10 to 40 wt. %, of component B.1.2).

Particularly preferred copolymers B.1) are those from styrene and acrylonitrile and optionally methyl methacrylate, from α-methylstyrene and acrylonitrile and optionally methyl methacrylate or from styrene and α-methylstyrene with acrylonitrile and optionally methyl methacrylate.

Styrene/acrylonitrile copolymers in accordance with component B.1) are known and can be prepared by radical polymerisation, in particular by emulsion, suspension, solution or bulk polymerisation. Copolymers in accordance with component B.1) preferably have molecular weights $M_w$ (weight average, determined by light scattering or sedimentation) between 15,000 and 200,000.

Particularly preferred copolymers B.1) according to the invention are also statistically structured copolymers from styrene, maleic anhydride and/or N-substituted maleic imide, which can be prepared by continuous bulk or solution polymerisation from the corresponding monomers, with incomplete conversion.

The proportions of the two components in suitable statistically structured styrene/maleic anhydride copolymers according to the invention may be varied between wide limits. The preferred amount of maleic anhydride is between 5 and 25 wt. %.

The molecular weight (number average $M_n$) of suitable statistically structured styrene/maleic anhydride copolymers according to the invention in accordance with component B.1) may be varied between wide limits. The range 60,000 to 200,000 is particularly preferred. An intrinsic viscosity of 0.3 to 0.9 dl/g (measured in dimethylformamide at 25° C.) is preferred for these products.

Instead of styrene, the vinyl copolymers B.1) may also contain ring-substituted styrenes such as vinyl toluene, 2,4-dimethylstyrene and other halogen-free substituted styrenes such as α-methylstyrene.

Component B.2)

Polyalkylene terephthalates in component B.2) are reaction products of aromatic dicarboxylic acids or their reactive derivatives, such as dimethyl esters or anhydrides, and aliphatic, cycloaliphatic or araliphatic diols and mixtures of these reaction products.

Preferred polyalkylene terephthalates contain at least 80 wt. %, preferably at least 90 wt. %, with respect to the dicarboxylic acid component, of terephthalic acid radicals and at least 80 wt. %, preferably at least 90 wt. %, with respect to the diol component, of ethylene glycol and/or butanediol-1,4 radicals.

Preferred polyalkylene terephthalates may contain, in addition to terephthalic acid radicals, up to 20 mol- %, preferably up to 10 mol- %, of radicals from other aromatic or cycloaliphatic dicarboxylic acids with 8 to 14 carbon atoms or aliphatic dicarboxylic acids with 4 to 12 carbon atoms, such as e.g. radicals from phthalic acid, isophthalic acid, naphthalene-2,6-dicarboxylic acid, 4,4-diphenyldicarboxylic acid, succinic acid, adipic acid, sebacic acid, azelaic acid, cyclohexane-diacetic acid.

Preferred polyalkylene terephthalates may contain, in addition to ethylene glycol or butanediol-1,4 radicals, up to 20 mol- %, preferably up to 10 mol- %, of other aliphatic diols with 3 to 12 carbon atoms or cycloaliphatic diols with 6 to 12 carbon atoms or cycloaliphatic diols with 6 to 21 carbon atoms, e.g. radicals from propanediol-1,3, 2-ethylpropanediol-1,3, neopentyl glycol, pentanediol-1,5, hexanediol-1,6, cyclohexane-dimethanol-1,4, 3-ethylpentanediol-2,4, 2-methylpentanediol-2,4, 2,2,4-trimethylpentanediol-1,3, 2-ethylhexanediol-1,3, 2,2-diethylpropanediol-1,3, hexanediol-2,5, 1,4-di-(β-hydroxyethoxy)-benzene, 2,2-bis-(4-hydroxycyclohexyl)-propane, 2,4-dihydroxy-1,1,3,3-tetramethyl-cyclobutane, 2,2-bis-(4-β-hydroxyethoxy-phenyl)-propane and 2,2-bis-(4-hydroxypropoxy-phenyl)propane (DE-OS 2 407 674, 2 407 776, 2 715 932).

The polyalkylene terephthalates may be branched by incorporating relatively small amounts of 3 or 4-hydric alcohols or of 3 or 4-basic carboxylic acids, e.g. in accordance with DE-OS 1 900 270 and U.S. Pat. No. 3,692,744. Examples of preferred branching agents are trimesic acid, trimellitic acid, trimethylol-ethane and propane and pentaerythritol.

Particularly preferred are polyalkylene terephthalates which have been prepared from only terephthalic acid and its reactive derivatives (e.g. its dialkyl esters) and ethylene glycol and/or butanediol-1,4, and mixtures of these polyalkylene terephthalates. Preferred mixtures contain 1 to 50 wt. %, preferably 1 to 30 wt. %, of polyethylene terephthalate and 50 to 99 wt. %, preferably 70 to 99 wt. %, of polybutylene terephthalate.

Polyalkylene terephthalates which are preferably used have in general an intrinsic viscosity of 0.4 to 1.5 dl/g, preferably 0.5 to 1.2 dl/g, measured in phenol/o-dichlorobenzene (1:1 parts by wt.) at 25° C. in a Ubbelohde viscometer.

The polyalkylene terephthalates can be prepared by known methods (see e.g. Kunststoff-Handbuch, vol. VIII, p. 695 et seq., Carl Hanser Verlag, Munich, 1973).

Component C)

Graft polymers C) are prepared by radical copolymerisation of monomer mixture C.1) from C.1.1) and C.1.2) in the presence of the rubber C.2) being grafted and are all known substances. Preferred methods of preparation for graft polymers C) are emulsion, solution, bulk or suspension polymerisation. Particularly preferred graft polymers C) are so-called ABS polymers.

Examples of monomers C.1) according to C.1.1) are styrene, α-methylstyrene, p-methylstyrene, methyl methacrylate or mixtures thereof, examples of monomers according to C.1.2) are acrylonitrile, methacrylonitrile, methyl methacrylate, n-butyl acrylate, t-butyl acrylate, maleic anhydride and N-phenylmaleic imide or mixtures thereof. Preferred monomers according to C.1.1) are styrene α-methylstyrene and methyl methacrylate. Preferred monomers according to C.1.2) are acrylonitrile, maleic anhydride, and methyl methacrylate. Particularly preferred monomers are styrene and acrylonitrile.

Rubbers C.2) suitable for preparing graft polymers in accordance with component C) are in particular polybutadiene, polyisoprene, styrene/butadiene copolymer rubbers, acrylonitrile/butadiene copolymer rubbers with gel contents (measured at 20° C.) greater than 30 wt. %, acrylate rubbers, EPDM (ethylene/-propylene/diene/monomer) rubbers and silicone rubbers.

Preferred rubbers C.2) are diene rubbers (e.g. based on buiadiene, isoprene, etc) or mixtures of diene rubbers or copolymers of diene rubbers or their mixtures with other copolymerisable monomers, e.g. in accordance with C.1.1) and C1.2), with the proviso that the glass transition temperature of component C.2) is below 10° C., preferably below −10° C.

Particularly preferred polymers C.2) are e.g. ABS polymers like those described in DE-OS 2 035 390 or in DE-OS 2 248 242.

Suitable acrylate rubbers C.2) are those based on $C_1$–$C_8$-alkyl acrylates, in particular ethyl, butyl, ethylhexyl acrylates. These alkyl acrylate rubbers may optionally contain up to 30 wt. %, with respect to the weight of rubber, of copolymerised monomers such as vinyl acetate, acrylonitrile, styrene, α-methylstyrene, ring-alkylated styrene, methyl methacrylate, acrylamide and/or vinylether. These alkyl acrylate rubbers may also contain small amounts, preferably up to 5 wt. %, with respect to the weight of rubber, of cross-linking ethylenically unsaturated monomers. Such cross-linking agents are, e.g. alkylenediol di(meth)acrylates, polyester di(meth)acrylates, divinylbenzene, trivinylbenzene, triallyl cyanurate, allyl (meth)acrylate, butadiene or isoprene.

Preferred cross-linking monomers are allyl methacrylate, ethylene glycol dimethacrylate, diallyl phthalate and heterocyclic compounds which possess at least 3 ethylenically unsaturated groups. Particularly preferred cross-linking monomers here are triallyl cyanurate, triallyl isocyanurate, trivinyl cyanurate, triacryloylhexahydro-s-triazin, triallyl benzenes. The amount of cross-linking monomers is preferably 0.02 to 5.0 wt. %, in particular 0.05 to 2.0 wt. %, with respect to the graft substrate C.2). In the case of cyclic cross-linking monomers with at least 3 ethylenically unsaturated groups, it is advantageous to restrict the amount to less than 1 wt. % of the graft substrate C.2).

Acrylate rubbers as graft substrates may also be products which contain a cross-linked diene rubber made from one or more conjugated dienes such as polybutadiene, or a copolymer of a conjugated diene with an ethylenically unsaturated monomer such as styrene and/or acrylonitrile, as the core.

Preferred rubbers for preparing graft polymers C) are pure diene and acrylate rubbers.

Further suitable graft substrates in accordance with C.2) are silicone rubbers with graft-active sites such as are described in DE-OS 3 704 657, DE-OS 3 704 655 and DE-OS 3 63 1 539.

The rubbers are present in the graft polymers C) in the form of at least partially cross-linked particles with an average particle size of 0.1 to 3 μm, in particular 0.2 to 0.6 μm. They are at least partially cross-linked, that is to say they have gel contents greater than 20 wt. %, preferably greater than 50 wt. %, in particular in the range 73 to 98 wt. % (measured in toluene).

Component D)

Silicone resins according to the invention in the present invention are solid and powdered and contain hydroxyl groups. They have the empirical formula (IV),

$$R_x Si(OR')_y O_{\frac{4-x-y}{2}} \quad \text{(IV)}$$

in which

R represents a monovalent hydrocarbon radical, which itself may optionally be substituted, but which represents in particular a methyl or a phenyl group, R' is an alkyl group or a hydrogen radical, x has a value of 0.75 to 1.75 and y has a value of 0.0001 to 0.5 and in which the silicone resin is built up from units of the formula $SiO_{4/2}$, $RSiO_{3/2}$, $R_2SiO_{2/2}$ and/or $R_3SiO_{1/2}$.

Production of silicone resins of the formula (IV) is known. For further processing or for use, it is presented in the form of solutions in suitable solvents, also in solution in polydimethylsiloxanes, in the form of solvent-containing aqueous emulsions or one hundred percent. A further advantageous application form is the coprecipitation of dispersions of polymers and graft polymers with emulsions of solvent-containing silicone resins. They ensure the highest degree of distribution in the plastics moulding compound.

Component E.1)

Polymer mixtures according to the invention contain phosphorus compounds of the formula (I) as a flameproofing agent,

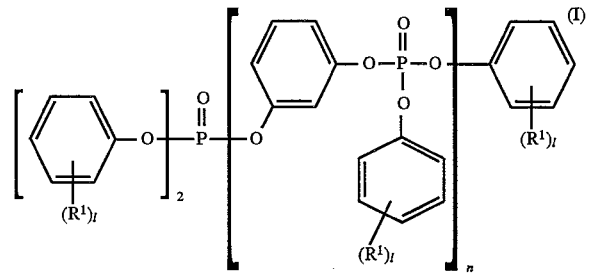

in which n, $R^1$ and 1 are defined in the same way as above.

Mixtures of different phosphates may also be used as component E.1) according to the invention. In this case, n has an average value between 1 and 5, preferably 1 and 2.

As a phosphorus compound of the formula (I), m-phenylene-bis-(diphenyl phosphate) with n equal to 1 and 2 or between 1 and 2 is preferably used.

Component E.2)

As a flameproofing agent, mixtures according to the invention may also contain a mixture of phosphorus compound(s) of the formula (I) and phosphorus compound(s) of the formula (II),

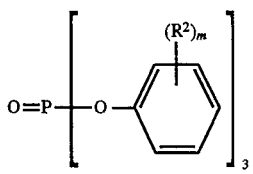

in which

R² and m are defined in the same way as above.

Triphenyl phosphate is preferably used as a phosphorus compound of the formula (II).

The mixture preferably contains 2 to 30 wt. % of phosphorus compound of the formula (II), with respect to 100 wt. % or E.1 and E.2.

The phosphates can generally be prepared by known processes (see for example Ullmann, Enzyklopädie der technischen Chemie, vol. 18, p. 301 et seq., 1979; Houben-Weyl, Methoden der organischen Chemie, vol. 12/1, p. 43; Beilstein, vol. 6, p. 177).

Moulding compounds according to the invention may also contain conventional additives such as lubricants and mould release agents, flow controlling agents, nucleating agents, antistatic agents, stabilisers, fillers and reinforcing materials as well as colorants and pigments and also, as a further flameproofing agent for the polycarbonate component, the salt of a halogen-free sulphonic acid. Preferred reinforcing materials are glass fibres, preferred fillers are glass beads, mica, quartz, talc, wollastonite, preferred pigments are carbon black and titanium dioxide. The preferred salt is the potassium salt of diphenylsulphonic acid.

Thermoplastic moulding compounds according to the invention containing the components A) to E) are prepared by mixing the particular constituents in a known manner and melt-compounding at temperatures of 200°–300° C. in conventional units such as internal mixers, extruders or twin shaft screws.

Mixing of the separate constituents may take place in a known manner either successively or simultaneously, in fact at elevated temperature.

The invention thus also provides a process for preparing thermoplastic polycarbonate moulding compounds comprising components A) to E) which is characterised in that the particular constituents mentioned above are mixed in a known manner and afterwards are melt compounded or melt extruded in conventional units at temperatures of 200° C. to 300° C.

The moulding compounds in the present invention may be used to produce moulded items of every type. In particular, moulded items may be produced by injection moulding. Examples of moulded items which can be produced are housings of every type (e.g. for domestic appliances and office machines) or covering sheets for the construction industry, parts for the private automobile sector. In addition, they may be used in the field of electrical engineering, because they possess very good electrical properties.

The moulding compounds are particularly suitable for producing thin-walled moulded items, (e.g. data processing housing parts) on which are placed especially high requirements with respect to the notched impact strength, stress cracking behaviour and dimensional stability of the plastics used.

Particle sizes always refer to average particle diameters $d_{50}$, determined by ultracentrifuge measurements in accordance with W. Scholtan et al., Kolloid-Z. und Z. Polymere 250 (1972) 782–796.

EXAMPLES

Materials used

Component A) (PC 1)

Polycarbonate based on bisphenol-A with a relative solution viscosity of 1.34 measured in methylene chloride at 25° C. at a concentration of 0.5 g/100 ml.

Component A) (PC 2)

Polycarbonate based on bisphenol-A with a relative solution viscosity of 1.29, measured in methylene chloride at 25° C. at a concentration of 0.5 g/100 ml.

Component B) (SAN)

Styrene/acrylonitrile copolymer with a styrene/acrylonitrile ratio of 72:28 and an intrinsic viscosity of 55 dl/g (measured in dimethylformamide at 20° C.).

Component C) (ABS)

Graft polymer of 45 wt. % of a styrene/acrylonitrile mixture in the ratio of 72:28 on 55 wt. % of particulate cross-linked polybutadiene rubber (average particle. diameter $d_{50}$ equal to 0.4 μm), prepared by emulsion polymerisation.

Component D) (M120)

Baysilone resin M 120 XB, solvent removed in a rotary evaporator, 100% (methylsilicone resin from Bayer AG).

Component D) (SFR100)

SFR100 (methylsilicone resin in polydimethylsiloxane from General Electric Silicones).

Component D) (P500)

Baysilone resin P 500 50% X/C, solvent removed in rotary evaporator, 100% (phenylsilicone resin from Bayer AG).

Component E.1) (RDP)

m-phenylene-bis-(diphenyl phosphate) (Fyroflex RDP from AKZO B.V.).

Component E.2) (RDP+TPP)

Mixture of 75.0 wt. % of m-phenylene-bis-(diphenyl phosphate) (see component E.1) and 25.0 wt. % of triphenyl phosphate (Disflamoll TP from Bayer AG).

Further phosphate component (TPP)

Triphenyl phosphate (Disflamoll TP from Bayer AG).

Further phosphate component (TIPP)

Triisopropylphenyl phosphate (Reofos 95 from CIBA-GEIGY INDUSTRIAL CHEMICALS)

Preparing and testing the moulding compounds

Flameproofed thermoplastic moulding compounds were prepared by kneading in a small mixer, model W 50 E from Brabender OHG, Duisburg, in the temperature range 210° to 230° C., at a speed of 60 rpm and with a mixing time of 10 min. The moulding compound prepared in this way was compression moulded on an electrically heated laboratory press, model Polystat 200 T from the Schwabenthan Co., to give sheets of 2.0 or 1.6 mm, the compression temperature being 200° C., the pressure applied being 200 bar and the time 5 min.

TABLE 1

Comparison examples, components used (data in wt. %)

| Component | A) PC1 | A) PC2 | B) SAN | C) ABS | D) M120 | D) SFR100 | D) P500 | E.1) RDP | E.2) RDP+TPP | TPP | TIPP |
|---|---|---|---|---|---|---|---|---|---|---|---|
| Comparison 1 | 70.0 | | 5.0 | 10.0 | | | | 15.0 | | | |
| Comparison 2 | | 70.0 | 5.0 | 10.0 | | | | 15.0 | | | |
| Comparison 3 | 70.0 | | 7.0 | 10.0 | 1.0 | | | | | 12.0 | |
| Comparison 4 | 70.0 | | 7.0 | 10.0 | | 1.0 | | | | 12.0 | |
| Comparison 5 | 70.0 | | 6.0 | 10.0 | | | 2.0 | | | 12.0 | |
| Comparison 6 | 70.0 | | 4.0 | 10.0 | 1.0 | | | | | 15.0 | |
| Comparison 7 | 70.0 | | 4.0 | 10.0 | | 1.0 | | | | 15.0 | |
| Comparison 8 | 70.0 | | 3.0 | 10.0 | | | 2.0 | | | 15.0 | |
| Comparison 9 | 70.0 | | 4.0 | 10.0 | 1.0 | | | | | | 15.0 |
| Comparison 10 | 70.0 | | 4.0 | 10.0 | | 1.0 | | | | | 15.0 |
| Comparison 11 | 70.0 | | 3.0 | 10.0 | | | 2.0 | | | | 15.0 |
| Comparison 12 | 69.7 + 0.3% PTFE | | 5.0 | 10.0 | | | | 15.0 | | | |

TABLE 2

Examples according to the invention, components used (data in wt. %)

| Component | A) PC1 | A) PC2 | B) SAN | C) ABS | D) M120 | D) SFR100 | D) P500 | E.1) RDP | E.2) RDP+TPP |
|---|---|---|---|---|---|---|---|---|---|
| Example 1 | 70.0 | | 4.0 | 10.0 | 1.0 | | | 15.0 | |
| Example 2 | | 70.0 | 4.0 | 10.0 | 1.0 | | | 15.0 | |
| Example 3 | 70.0 | | 4.0 | 10.0 | 1.0 | | | | 15.0 |
| Example 4 | 70.0 | | 4.0 | 10.0 | | 1.0 | | 15.0 | |
| Example 5 | | 70.0 | 4.0 | 10.0 | | 1.0 | | 15.0 | |
| Example 6 | 70.0 | | 4.0 | 10.0 | | 1.0 | | | 15.0 |
| Example 7 | 70.0 | | 3.0 | 10.0 | | | 2.0 | 15.0 | |
| Example 8 | | 70.0 | 3.0 | 10.0 | | | 2.0 | 15.0 | |
| Example 9 | 70.0 | | 3.0 | 10.0 | | | 2.0 | | 15.0 |
| Example 10 | Composition analogous to example 1 | | | | | | | | |
| Example 11 | Composition analogous to example 2 | | | | | | | | |
| Example 12 | Composition analogous to example 3 | | | | | | | | |
| Example 13 | Composition analogous to example 4 | | | | | | | | |
| Example 14 | Composition analogous to example 5 | | | | | | | | |
| Example 15 | Composition analogous to example 6 | | | | | | | | |
| Example 16 | Composition analogous to example 7 | | | | | | | | |
| Example 17 | Composition analogous to example 8 | | | | | | | | |

The test rods required were sawn from the sheets and these were subjected to the following tests:

Impact resistance according to DIN 43 543 ($a_n$),

Dimensional stability at high temperature according to DIN 53 460 (Vicat B),

Oxygen index (LOI value) according to ASTM D-2863-77,

Fire test according to the Underwriter Laboratories (UL) 94 instructions.

The stress cracking behaviour was tested using rods with the dimensions 80×10×4 mm, compression temperature 220° C. The test medium used was a mixture of 60 vol. % of toluene and 40 vol. % of isopropanol. The test specimens were pre-stretched on an arc-shaped jig (pre-stretching given as a percentage) and stored at room temperature in the test medium. The stress cracking behaviour was assessed using the formation of cracks or of fractures as a function of exposure time in the test medium.

Table 3 gives the test data obtained.

TABLE 3

| | Test data | | | UL 94 assessment | |
|---|---|---|---|---|---|
| | $a_n$ kJ/m² | Vicat B °C. | LOI Index % O₂ | Thichness of specimen | Burning time, sec |
| Comparison 1 | 46/n.b.* | 87 | 28.5 | V-2/2.1 mm | 60 |
| Comparison 2 | 45/n.b. | 87 | — | V-2/2.1 mm | 74 |
| Comparison 3 | 47/n.b. | 92 | 27.0 | n.r./2.1 mm | 160 |
| Comparison 4 | 46/n.b. | 92 | 29.5 | V-2/2.1 mm | 148 |
| Comparison 5 | 48/n.b. | 91 | 27.5 | V-2/2.1 mm | 175 |
| Comparison 6 | 46/n.b. | 80 | 26.5 | V-1/2.1 mm | 50 |
| Comparison 7 | 43/n.b. | 82 | 30.5 | V-1/2.1 mm | 58 |
| Comparison 8 | 42/n.b. | 79 | 28.5 | V-1/2.1 mm | 92 |
| Comparison 9 | 44/n.b. | 92 | 26.5 | V-2/2.1 mm | 133 |
| Comparison 10 | 47/n.b. | 81 | 30.0 | V-1/2.1 mm | 112 |
| Comparison 11 | 43/n.b. | 87 | 28.0 | V-2/2.1 mm | 111 |
| Comparison 12 | 53/n.b. | 92 | 33.0 | V-0/2.1 mm | 12 |
| Example 1 | 54/n.b. | 91 | 30.0 | V-0/2.1 mm | 33 |
| Example 2 | 37/n.b. | 92 | 29.5 | V-0/2.1 mm | 20 |
| Example 3 | 48/n.b. | 95 | 27.5 | V-0/2.1 mm | 36 |

TABLE 3-continued

Test data

| | $a_n$ kJ/m² | Vicat B °C. | LOI Index % O₂ | UL 94 assessment Thickness of specimen | Burning time, sec |
|---|---|---|---|---|---|
| Example 4 | 53/n.b. | 89 | 30.0 | V-0/2.1 mm | 16 |
| Example 5 | 48/n.b. | 88 | 32.5 | V-0/2.1 mm | 8 |
| Example 6 | 45/n.b. | 91 | 34.5 | V-0/2.1 mm | 10 |
| Example 7 | 46/n.b. | 87 | 30.5 | V-0/2.1 mm | 9 |
| Example 8 | 64/n.b. | 85 | 30.5 | V-0/2.1 mm | 17 |
| Example 9 | 52/n.b. | 85 | 31.0 | V-1/1.6 mm | 55 |
| Example 10 | 23/n.b. | 91 | 30.0 | V-0/1.6 mm | 48 |
| Example 11 | 23/n.b. | 92 | 29.5 | V-0/1.6 mm | 44 |
| Example 12 | 21/n.b. | 95 | 27.5 | V-1/1.6 mm | 87 |
| Example 13 | 24/n.b. | 89 | 30.0 | V-0/1.6 mm | 36 |
| Example 14 | 21/n.b. | 88 | 32.5 | V-0/1.6 mm | 39 |
| Example 15 | 22/n.b. | 91 | 34.5 | V-0/1.6 mm | 34 |
| Example 16 | 26/n.b. | 87 | 30.5 | V-1/1.6 mm | 123 |
| Example 17 | 21/n.b. | 85 | 30.5 | V-1/1.6 mm | 96 |

*n.b. = not broken

The moulding compound in example 6 (with RDP+TPP) has improved stress cracking behaviour as compared with that in example 4 (with RDP alone) (for a pre-stress of 2.4%, surface cracks and dissolution after 10 minutes as compared with 5 minutes).

It can be seen from Table 3 that moulding compounds according to the invention (examples 1 to 17).

with a concentration of 1 or 2 wt. % of silicone resin and 15 wt. % of m-phenylene-bis(diphenyl phosphate) have a V-0 or V-1 with 2.1 mm (examples 1, 2, 4, 5, 7, 8), or even with 1.6 mm thick specimens (examples 10, 11, 13, 14, 16 and 17), with a concentration of 1 or 2 wt. % of silicone resin and 15 wt. % of a mixture of m-phenylene-bis-(diphenyl phosphate) and triphenyl phosphate (75 and 25 wt. %) also have a V-0 or V-1 at 2.1 mm and 1.6 mm thickness (examples 3, 6 and 9 as well as 12 and 15), have high impact strengths and thermal distortion temperatures.

Furthermore, it can be seen from the comparison examples (comparisons 1 to 12), that when there is no silicone resin component in the samples, only V-2/2.1 mm is achieved (comparisons 1 and 2), with a silicone resin content of 1 or 2 wt. % and a triphenyl phosphate content of 12 wt. % only "non resistant" or V-2 is produced at 2.1 mm (comparisons 3, 4 and 5), With a silicone resin content of 1 or 2 wt. % and a triphenyl phosphate content of 15 wt. %, although V-1 is produced at 2.1 mm, the softening temperature drops to ca. 80° C. (comparisons 6, 7 and 8), When using triisopropylphenyl phosphate as the other phosphate, only V-2 is achieved at 2.1 mm (comparisons 10, 11 and 12).

Examples 1, 4 and 7 show that small mounts of silicone resin with conventional amounts of m-phenylene-bis-(diphenyl phosphate), also mixed with triphenyl phosphate (examples 3, 6 and 9), in association with the considerable advantage of absence of halogens, can take on the antidrip properties of polytetrafluroethylene (comparison 12).

We claim:

1. Halogen-free thermoplastic moulding compounds, consisting of

A) 60 to 90 wt. % of thermoplastic aromatic polycarbonate,
B) 1 to 15 wt. % of
  B.1) a thermoplastic copolymer of
    B.1.1) 50 to 95 wt. % of styrene, α-methylstyrene, ring-alkylated styrene, $C_1$–$C_8$-alkyl acrylate, $C_1$–$C_8$-alkyl methacrylate or mixtures thereof and
    B.1.2) 5 to 50 wt. % of acrylonitrile, methacrylonitrile, $C_1$–$C_8$-alkyl acrylate, $C_1$–$C_8$-alkyl methacrylate, maleic anhydride, N-substituted maleic imide, vinyl acetate or mixtures thereof
C) 5 to 15 wt. % of a graft polymer prepared from
  C.1) 5 to 90 wt. % of a mixture of
    C.1.1) 50 to 95 wt. % of styrene, α-methylstyrene, ring-alkylated styrene, $C_1$–$C_8$-alkyl acrylate, $C_1$–$C_8$-alkyl methacrylate or mixtures thereof and
    C.1.2) 5 to 50 wt. % of acrylonitrile, methacrylonitrile, $C_1$–$C_8$-alkyl acrylate, $C_1$–$C_8$-alkyl methacrylate, maleic anhydride, N-substituted maleic imide or mixtures thereof, on
  C.2) 10 to 95 wt. % of rubber with a glass transition temperature $T_G \leq 10°$ C.,
D) 1 to 3 wt. % of hydroxyl-containing silicone resin of the formula (IV),

in which
R represents a monovalent hydrocarbon radical, which itself may optionally be substituted, but which represents in particular a methyl or a phenyl group,
R' is an alkyl group or a hydrogen radical,
x has a value of 0.75 to 1.75 and
y has a value of 0.0001 to 0.5 and in which the silicone resin is built up from units of the formula $SiO_{4/2}$, $RSiO_{3/2}$, $R_2SiO_{2/2}$ and/or $R_3SiO_{1/2}$, and E) 5 to 15 wt. % of phosphates consisting of a mixture of phosphorus compounds of the formula (I),

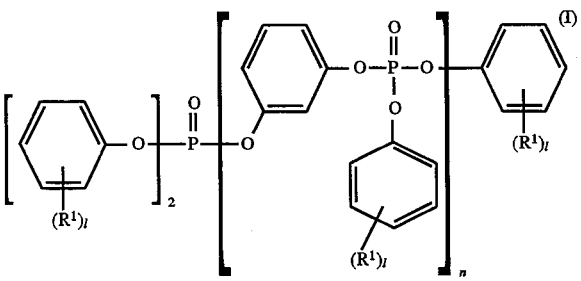

in which
n represents the numbers 1 to 5,
$R^1$ represents methyl and
1 represents the numbers 0 to 5 and
phosphorus compounds of the formula (II),

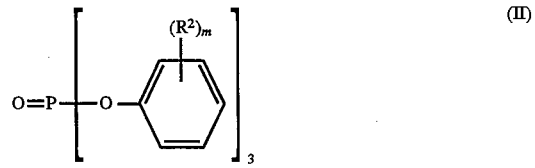

in which
$R^2$ represents methyl and
m represents the numbers 0 to 5, wherein the amount of phosphorus compound of the formula (II) in the phosphate mixture of (I) and (II) is a maximum of 35 wt. %.

2. Thermoplastic moulding compounds according to claim 1, characterised in that mixtures of m-phenylene-bis-(diphenyl phosphate) and triphenyl phosphate are used as component E).

3. A method of making moulded articles, comprising the step of moulding the thermoplastic moulding compounds according to claim 1 to form shaped articles.

4. Moulded articles produced from thermoplastic moulding compounds according to claim 1.

5. Halogen-free thermoplastic moulding compounds, consisting of
A) 60 to 90 wt. % of thermoplastic aromatic polycarbonate,
B) 1 to 15 wt. % of
B.1) a thermoplastic copolymer of
B.1.1) 50 to 95 wt. % of styrene, α-methylstyrene, ring-alkylated styrene, $C_1$–$C_8$-alkyl acrylate, $C_1$–$C_8$-alkyl methacrylate or mixtures thereof and
B.1.2) 5 to 50 wt. % of acrylonitrile, methacrylonitrile, $C_1$–$C_8$-alkyl acrylate, $C_1$–$C_8$-alkyl methacrylate, maleic anhydride, N-substituted maleic imide, vinyl acetate or mixtures thereof
C) 5 to 15 wt. % of a graft polymer prepared from
C.1) 5 to 90 wt. % of a mixture of
C.1.2) 50 to 95 wt. % of styrene, α-methylstyrene, ring-alkylated styrene, $C_1$–$C_8$-alkyl acrylate, $C_1$–$C_8$-alkyl methacrylate or mixtures thereof and
C.1.2) 5 to 50 wt. % of acrylonitrile, methacrylonitrile, $C_1$–$C_8$-alkyl acrylate, $C_1$–$C_8$-alkyl methacrylate, maleic anhydride, N-substituted maleic imide or mixtures thereof, on
C.2) 10 to 95 wt. of rubber with a glass transition temperature TG ≦ 10° C.,
D) 1 to 3 wt. % of hydroxyl-containing silicone resin of the formula (IV),

in which
R represents a monovalent hydrocarbon radical, which itself may optionally be substituted, but which represents in particular a methyl or a phenyl group,
R' is an alkyl group or a hydrogen radical,
X has a value of 0.75 to 1.75 and
y has a value of 0.0001 to 0.5 and in which the silicone resin is built up from units of the formula $SiO_{4/2}$, $RSiO_{3/2}$, $R_2SiO_{2/2}$ and/or $R_3SiO_{1/2}$ 5 to 15 wt. % of phosphates consisting of a mixture of phosphorus compounds of the formula (I),

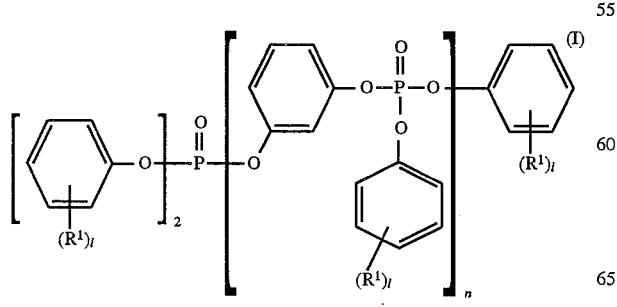

in which n represents the numbers 1 to 5,
$R^1$ represents methyl and
l represents the numbers 0 to 5 and
phosphorus compounds of the formula (II),

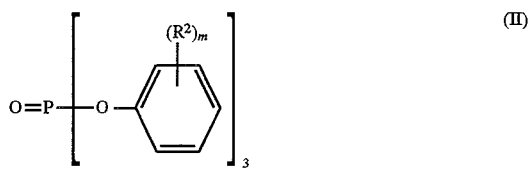

in which
$R^2$ represents methyl and
m represents the numbers 0 to 5,
wherein the amount of phosphorus compound of the formula (II) in the phosphate mixture of (I) and (II) is a maximum of 35 wt. %, and, in addition to components A) to E), one or more additives selected from the group consisting of mould release agents, flow control agents, nucleating agents, stabilisers, antistatic agents, fillers, colorants and a salt of a halogen-free sulphonic acid.

6. Halogen-free thermoplastic moulding compounds, consisting of
A) 60 to 90 wt. % of thermoplastic aromatic polycarbonate,
B) 1 to 15wt. % of
B.1) a thermoplastic copolymer of
B.1.1) 50 to 95 wt. % of styrene, α-methylstyrene, ring-alkylated styrene, $C_1$–$C_8$-alkyl acrylate, $C_1$–$C_8$-alkyl methacrylate or mixtures thereof and
B.1.2) 5 to 50 wt. % of acrylonitrile, methacrylonitrile, $C_1$–$C_8$-alkyl acrylate, $C_1$–$C_8$-alkyl methacrylate, maleic anhydride, N-substituted maleic imide, vinyl acetate or mixtures thereof
C) 5 to 15 wt. % of a graft polymer prepared from
C.1) 5 to 90 wt. % of a mixture of
C.1.1) 50 to 95 wt. % of styrene, α-methylstyrene, ring-alkylated styrene, $C_1$–$C_8$-alkyl acrylate, $C_1$–$C_8$-alkyl methacrylate or mixtures thereof and
C.1.2) 5 to 50 wt. % of acrylonitrile, methacrylonitrile, $C_1$–$C_8$-alkyl acrylate, $C_1$–$C_8$-alkyl methacrylate, maleic anhydride, N-substituted maleic imide or mixtures thereof, on
C.2) 10 to 95 wt. % of rubber with a glass transition temperature TG ≦ 10° C.,
D) 1 to 3 wt. % of hydroxyl-containing silicone resin of the formula (IV),

in which
R represents a monovalent hydrocarbon radical, which itself may optionally be substituted, but which represents in particular a methyl or a phenyl group,
R' is an alkyl group or a hydrogen radical,
x has a value of 0.75 to 1.75 and
y has a value of 0.0001 to 0.5 and in which the silicone resin is built up from units of the formula $SiO_{4/2}$, $RSiO_{3/2}$, $R_2SiO_{2/2}$ and/or $R_3SiO_{1/2}$ 5 to 15 wt. % of phosphates consisting of a mixture of phosphorus compounds of the formula (I),

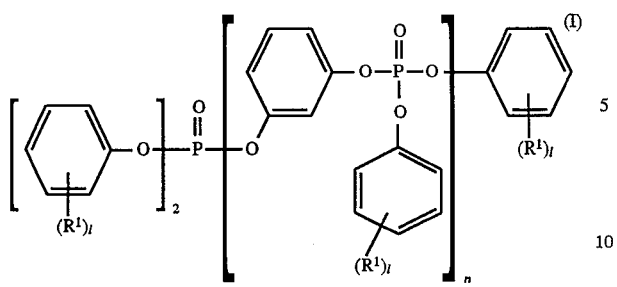

in which
n represents the numbers 1 to 5;
R² represents methyl and
l represents the numbers 0 to 5 and
phosphorus compounds of the formula (II),

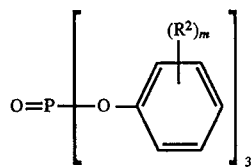

in which
R² represents methyl and
m represents the numbers 0 to 5,
wherein the amount of phosphorus compound of the formula (II) in the phosphate mixture of (I) and (II) is a maximum of 35 wt. %, and, in addition to components A) to E), one or more additives selected from the group consisting of lubricants, flow control agents, nucleating agents, stabilisers, antistatic agents, fillers, colorants and a salt of a halogen-free sulphonic acid.

7. Halogen-free thermoplastic moulding compounds according to claim 5, wherein said colorants are pigments.

8. Halogen-free thermoplastic moulding compounds according to claim 6, wherein said colorants are pigments.

9. Halogen-free thermoplastic moulding compounds according to claim 5, wherein said fillers are reinforcing materials.

10. Halogen-free thermoplastic moulding compounds according to claim 6, wherein said fillers are reinforcing materials.

* * * * *

UNITED STATES PATENT AND TRADEMARK OFFICE
CERTIFICATE OF CORRECTION

PATENT NO. : 5,658,974
DATED : August 19, 1997
INVENTOR(S) : Karl Fuhr, et al.

It is certified that error appears in the above-identified patent and that said Letters Patent is hereby corrected as shown below:

In Column 15, line 30 (Claim 5) "C.1.2)" should read --C.1.1)-- and in Column 15, line 37, "10 to 95 wt." should read --10 to 95 wt.%--.

In Column 17, line 15, "$R^2$" should be --$R^1$--.

Signed and Sealed this

Twenty-fourth Day of March, 1998

Attest:

BRUCE LEHMAN

*Attesting Officer*  *Commissioner of Patents and Trademarks*

UNITED STATES PATENT AND TRADEMARK OFFICE
CERTIFICATE OF CORRECTION

PATENT NO. : 5,658,974
DATED : August 19, 1997
INVENTOR(S) : Fuhr et al.

It is certified that error appears in the above-identified patent and that said Letters Patent is hereby corrected as shown below:

In Column 15, line 53 (Claim 5) "5 to 15 wt.%" should read --E) 5 to 15 wt.%-- .

In Column 16, line 66 (Claim 6), "5 to 15 wt.%" should read --E) 5 to 15 wt.%--.

Signed and Sealed this

Twenty-first Day of April, 1998

Attest:

BRUCE LEHMAN

Attesting Officer     Commissioner of Patents and Trademarks